(12) United States Patent
Sigelagelani et al.

(10) Patent No.: US 10,692,097 B2
(45) Date of Patent: Jun. 23, 2020

(54) SYSTEM AND METHOD FOR INSTANTLY MEASURING AND UPDATING CUSTOMER LOYALTY FOR BRANDS ON A DIGITAL WORLD MAP THROUGH UTILIZATION OF COLOR AND DIGITS

(71) Applicants: Bhekimpilo M Sigelagelani, Tipton (GB); Michael Cho, Singapore (SG)

(72) Inventors: Bhekimpilo M Sigelagelani, Tipton (GB); Michael Cho, Singapore (SG)

( * ) Notice: Subject to any disclaimer, the term of this patent is extended or adjusted under 35 U.S.C. 154(b) by 561 days.

(21) Appl. No.: 14/245,567

(22) Filed: Apr. 4, 2014

(65) Prior Publication Data
US 2015/0287049 A1    Oct. 8, 2015

Related U.S. Application Data

(60) Provisional application No. 61/808,488, filed on Apr. 4, 2013.

(51) Int. Cl.
*G06Q 30/02*    (2012.01)

(52) U.S. Cl.
CPC .............................. *G06Q 30/0201* (2013.01)

(58) Field of Classification Search
CPC ........ G06Q 10/00; G06Q 40/00; G06Q 40/06; G06F 17/60
USPC ...................................................... 705/7.29
See application file for complete search history.

(56) References Cited

U.S. PATENT DOCUMENTS

| | | | | |
|---|---|---|---|---|
| 8,521,590 | B1* | 8/2013 | Hanusch ................ | G06Q 30/02 705/14.3 |
| 8,903,754 | B2* | 12/2014 | Kaplinger ......... | G06F 17/30997 705/1.1 |
| 2008/0262915 | A1* | 10/2008 | Gojkovic ............... | G06Q 30/02 705/14.27 |
| 2011/0288922 | A1* | 11/2011 | Thomas ................ | G06Q 30/02 705/14.23 |
| 2012/0116840 | A1* | 5/2012 | Omer ..................... | G06Q 30/02 705/7.29 |
| 2013/0103484 | A1* | 4/2013 | McLaughlin ...... | G06Q 30/0226 705/14.33 |
| 2013/0166388 | A1* | 6/2013 | Rodriguez ......... | G06Q 30/0207 705/14.64 |
| 2013/0254032 | A1* | 9/2013 | Mandke ................ | G06Q 20/20 705/14.55 |

* cited by examiner

*Primary Examiner* — Romain Jeanty

(57) ABSTRACT

A system and method for instantly measuring and updating customer loyalty for one or more brands on a digital world map through utilization of color and digits is disclosed. The system may include a measuring and updating customer loyalty for one or more brands non-transitory storage media. The method may include uploading a measuring and updating customer loyalty for one or more brands non-transitory storage media onto a memory system declaring brand loyalty thereby increasing a brand's indicia color on a digital world map and retracting brand loyalty thereby decreasing the brand's indicia color on the digital world map.

1 Claim, 4 Drawing Sheets

SYSTEM AND METHOD FOR INSTANTLY MEASURING AND UPDATING CUSTOMER LOYALTY FOR BRANDS ON A DIGITAL WORLD MAP THROUGH UTILIZATION OF COLOR AND DIGITS

This application claims priority to U.S. Provisional application 61/808,488 filed on Apr. 4, 2013, the entire disclosure of which is incorporated by reference.

BACKGROUND OF THE INVENTION

Field of the Invention

The present invention is a system and method for measuring and updating. More specifically, the present invention is a system and method for instantly measuring and updating customer loyalty for one or more brands on a digital world map through utilization of color and digits.

Description of the Related Art

It is difficult for brands to measure how popular their customer loyalty is in relation to other brands. Brands may increase their revenue by offering attractive offers of their products or services to loyalists through carefully managed campaigns, while loyalists may have access to the most competitive prices for declaring their loyalty to a brand.

BRIEF SUMMARY OF THE INVENTION

The present invention is a system and method for measuring and updating. More specifically, the present invention is a system and method for instantly measuring and updating customer loyalty for brands on a digital world map through utilization of color and digits.

The system to instantly measure and update customer loyalty for brands on a digital world map through utilization of color and digits may include a server system with a processor system, a communications interface, a communications system, an input system and an output system, the server system having access to a communications network, a memory system with an operating system, a communications module, a web browser module, a web server application and a measuring and updating customer loyalty for one or more brands non-transitory storage media and a website displaying a plurality of web pages residing on the measuring and updating customer loyalty for one or more brands non-transitory storage media.

The method for instantly measuring and updating customer loyalty for brands on a digital world map through utilization of color and digits includes the steps of uploading a measuring and updating customer loyalty for one or more brands non-transitory storage media onto a memory system and a processing system, declaring brand loyalty thereby increasing a brand's indicia color on the digital world map and retracting brand loyalty thereby decreasing the brand's indicia color on the digital world map.

It is an object of the present invention to provide a system and method for instantly measuring and updating customer loyalty for brands on a digital world map through utilization of color and digits that gives the brands an option to purchase virtual loyalists.

It is an object of the present invention to provide a system and method for instantly measuring and updating customer loyalty for brands on a digital world map through utilization of color and digits that allow brands a better insight into seeing how popular their brand is in comparison to other competing brands.

It is an object of the present invention to provide a system and method for instantly measuring and updating customer loyalty for brands on a digital world map through utilization of color and digits that tracks every action relating to when a registered user or loyalist declares or retracts their loyalty from a brand.

It is an object of the present invention to provide a system and method for instantly measuring and updating customer loyalty for brands on a digital world map through utilization of color and digits that has an automatic and instant update that takes place relating to the size of a brand's representative color on a digital world map each time there is a declaration or retraction in loyalty by a registered user or loyalist.

It is an object of the present invention to provide a system and method for instantly measuring and updating customer loyalty for brands on a digital world map through utilization of color and digits where registered users or loyalists may only declare loyalty to one brand at a time but create as many brands as they wish.

It is an object of the present invention to provide a system and method for instantly measuring and updating customer loyalty for brands on a digital world map through utilization of color and digits where an increase in loyalists will result in the growth of a brand's color on the digital world map and vice-versa.

It is an object of the present invention to provide a system and method for instantly measuring and updating customer loyalty for brands on a digital world map through utilization of color and digits where the color representing a brand increases or decreases in size from a single point on the country of the digital world map.

It is an object of the present invention to provide a system and method for instantly measuring and updating customer loyalty for brands on a digital world map through utilization of color and digits that utilizes different digital country and world maps that explicitly relate to consumer products and services such as fashion, sports, music, cars, restaurants, politics and technology.

BRIEF DESCRIPTION OF THE DRAWINGS

The present invention will be described by way of exemplary embodiments, but not limitations, illustrated in the accompanying drawing in which like references denote similar elements, and in which.

DETAILED DESCRIPTION OF ILLUSTRATIVE EMBODIMENTS

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

Various operations will be described as multiple discrete operations, in turn, in a manner that is most helpful in understanding the present invention. However, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

Figure 1:
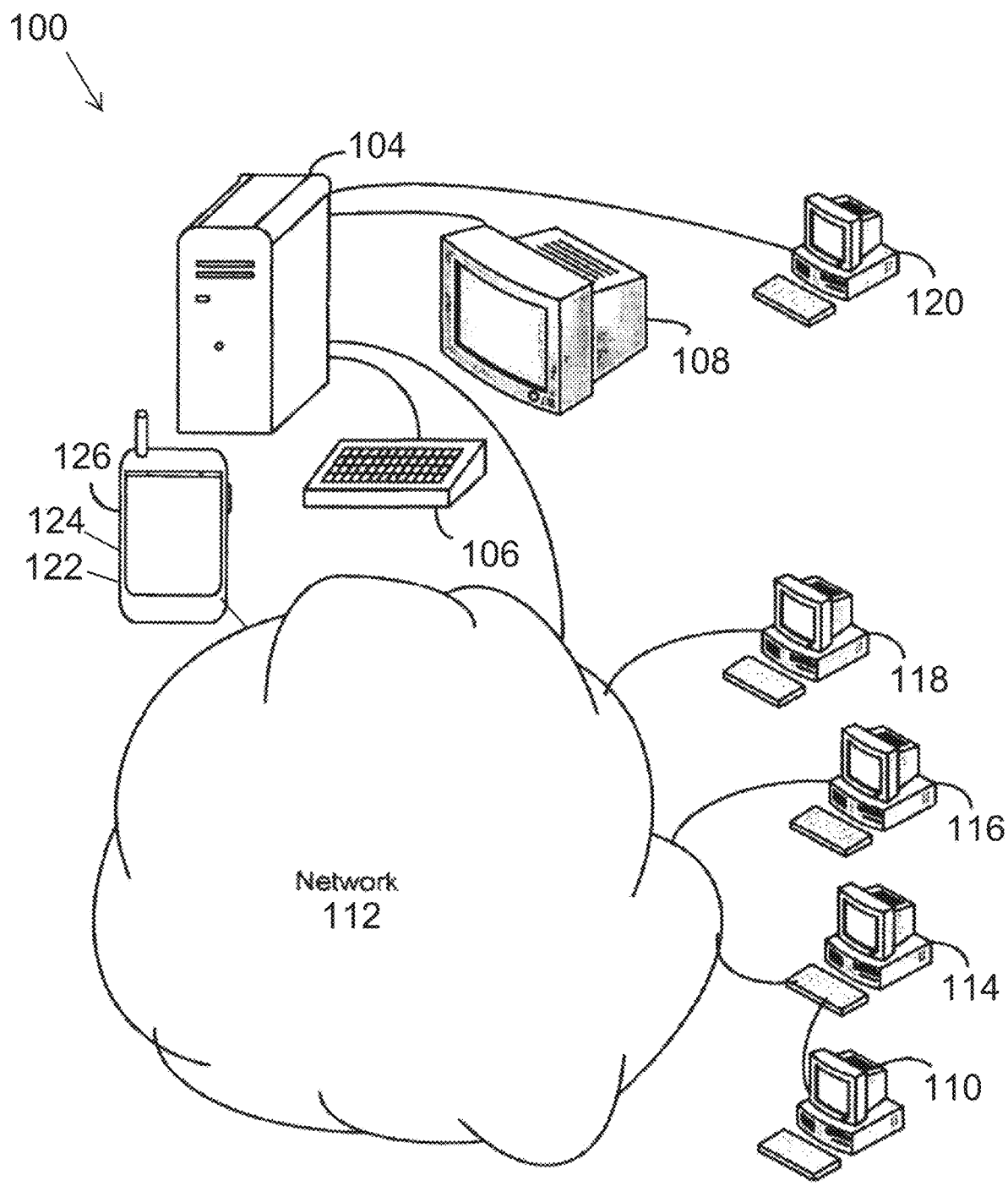
FIG. 1 illustrates a system overview of a system to image a patient user's body part, in accordance with one embodiment of the present invention.

FIG. 1 illustrates a system overview of a system 100 to image a patient user's body part, in accordance with one embodiment of the present invention.

The system 100 may include a server system 104, an input system 106, an output system 108, a plurality of client systems 110, 114, 116, 118 and 120, a communications network 112 and a handheld or mobile device 122. In other embodiments, the system 100 may include additional components and/or may not include all of the components listed above.

The server system 104 may include one or more servers. One server 104 may be the property of the distributor of any related software or non-transitory storage media. In other embodiments, the system 100 may include additional components and/or may not include all of the components listed above.

The input system 106 may be utilized for entering input into the server system 104, and may include any one of, some of, any combination of, or all of a keyboard system, a mouse system, a track ball system, a track pad system, a plurality of buttons on a handheld system, a mobile system, a scanner system, a wireless receiver, a microphone system, a connection to a sound system, and/or a connection and/or an interface system to a computer system, an intranet, and/or the Internet (i.e., IrDA, USB).

The output system 108 may be utilized for receiving output from the server system 104, and may include any one of, some of, any combination of or all of a monitor system, a wireless transmitter, a handheld display system, a mobile display system, a printer system, a speaker system, a connection or an interface system to a sound system, an interface system to one or more peripheral devices and/or a connection and/or an interface system to a computer system, an intranet, and/or the Internet.

The system 100 may illustrate some of the variations of the manners of connecting to the server system 104, which may be a website (FIG. 3, 316) such as an information providing website (not shown). The server system 104 may be directly connected and/or wirelessly connected to the plurality of client systems 110, 114, 116, 118 and 120 and may be connected via the communications network 112. Client systems 120 may be connected to the server system 104 via the client system 118. The communications network 112 may be any one of, or any combination of, one or more local area networks or LANs, wide area networks or WANs, wireless networks, telephone networks, the Internet and/or other networks. The communications network 112 may include one or more wireless portals. The client systems 110, 114, 116, 118 and 120 may be any system that an end user may utilize to access the server system 104. For example, the client systems 110, 114, 116, 118 and 120 may be personal computers, workstations, tablet computers, laptop computers, game consoles, hand-held network enabled audio/video players, mobile devices and/or any other network appliance.

The client system 120 may access the server system 104 via the combination of the communications network 112 and another system, which may be the client system 118. The client system 120 may be a handheld or mobile wireless device 122, such as a mobile phone, a tablet computer or a handheld network-enabled audio/music player, which may also be utilized for accessing network content. The client system 120 may be a cell phone with an operating system or SMARTPHONE® 124 or a tablet computer with an operating system or IPAD® 126.

Figure 2:
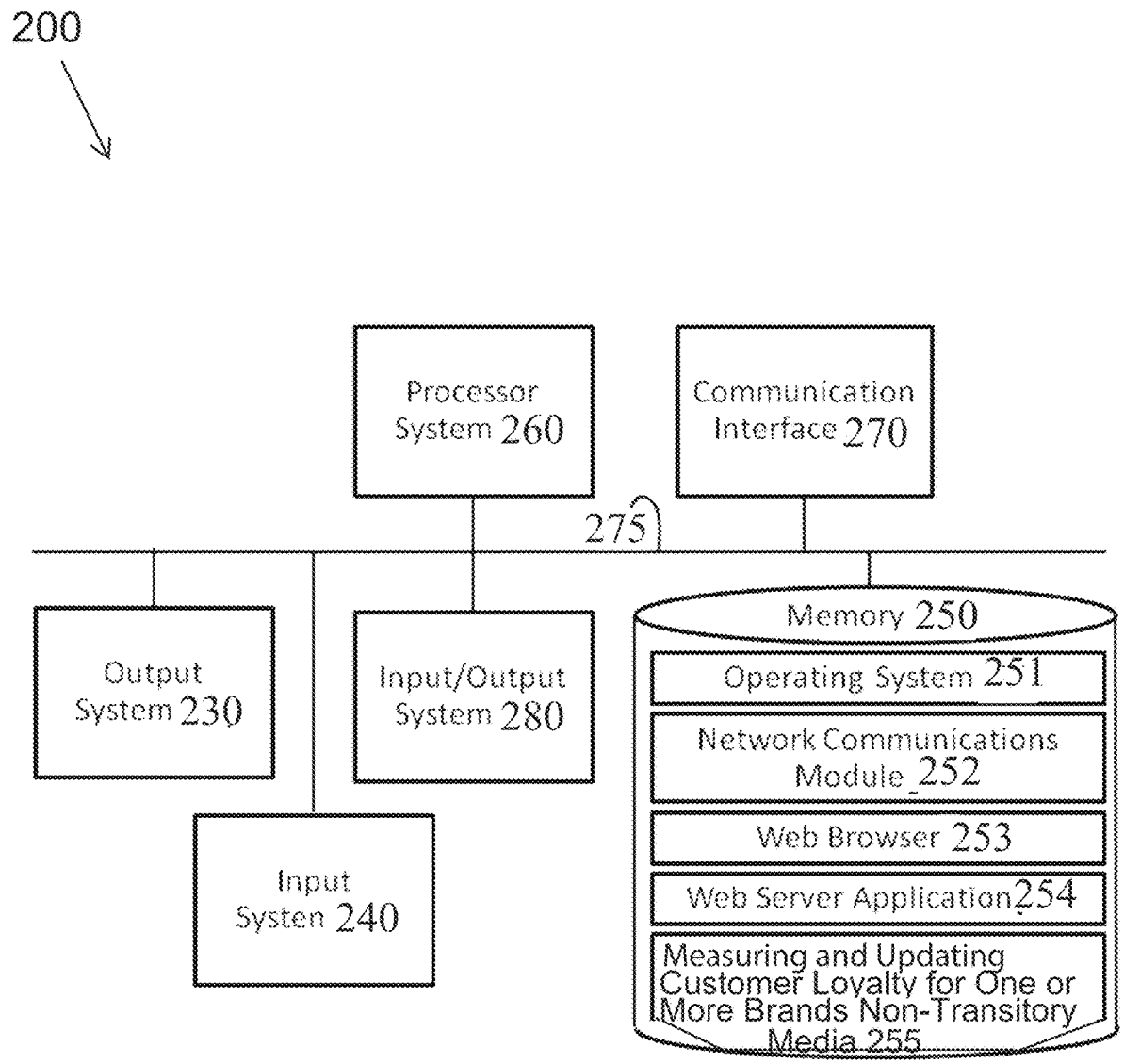
FIG. 2 illustrates a block diagram of a server system, in accordance with one embodiment of the present invention.

FIG. 2 illustrates a block diagram of a server system 200, in accordance with one embodiment of the present invention.

The server system 200 may include an output system 230, an input system 240, a memory system 250, which may store an operating system 251, a communications module 252, a web browser module 253, a web server application 254 and a measuring and updating customer loyalty for one or more brands non-transitory storage media 255. The server system 200 may also include a processor system 260, a communications interface 270, a communications system 275 and an input/output system 280. In other embodiments, the server system 200 may include additional components and/or may not include all of the components listed above.

The output system 230 may include any one of, some of, any combination of, or all of a monitor system, a handheld display system, a printer system, a speaker system, a connection or interface system to a sound system, an interface system to one or more peripheral devices and/or a connection and/or interface system to a computer system, an intranet, and/or the Internet.

The input system 240 may include any one of, some of, any combination of, or all of a keyboard system, a mouse system, a track ball system, a track pad system, one or more buttons on a handheld system, a scanner system, a microphone system, a connection to a sound system, and/or a connection and/or an interface system to a computer system, an intranet, and/or the Internet (i.e., IrDA, USB).

The memory system 250 may include any one of, some of, any combination of, or all of a long term storage system, such as a hard drive; a short term storage system, such as a random access memory; or a removable storage system, such as a floppy drive or a removable drive and/or a flash memory. The memory system 250 may include one or more machine readable mediums that may store a variety of different types of information. The term machine readable medium may be utilized to refer to any medium capable of carrying information that may be readable by a machine. One example of a machine-readable medium may be a computer-readable medium such as a non-transitory storage media. The memory system 250 may store one or more machine instructions for measuring and updating customer loyalty for one or more brands. The operating system 251 may control all software or non-transitory storage media and hardware of the system 100. The communications module 252 may enable the server system 304 to communicate on the communications network 112. The web browser module 253 may allow for browsing the Internet. The web server application 254 may serve a plurality of web pages to client systems that request the web pages, thereby facilitating browsing on the Internet.

The processor system 260 may include any one of, some of, any combination of, or all of multiple parallel processors, a single processor, a system of processors having one or more central processors and/or one or more specialized processors dedicated to specific tasks. The processor system 260 may implement the machine instructions stored in the memory system 250.

In an alternative embodiment, the communication interface 270 may allow the server system 200 to interface with the network 112. In this embodiment, the output system 230 may send communications to the communication interface 270. The communications system 275 communicatively links the output system 230, the input system 240, the memory system 250, the processor system 260 and/or the input/output system 280 to each other. The communications system 275 may include any one of, some of, any combination of, or all of one or more electrical cables, fiber optic cables, and/or sending signals through air or water (i.e., wireless communications). Some examples of sending signals through air and/or water may include systems for transmitting electromagnetic waves such as infrared and/or radio waves and/or systems for sending sound waves.

The input/output system 280 may include devices that have the dual function as the input and output devices. For example, the input/output system 280 may include one or more touch sensitive screens, which display an image and therefore may be an output device and accept input when the screens may be pressed by a finger or a stylus. The touch sensitive screens may be sensitive to heat and/or pressure. One or more of the input/output devices may be sensitive to a voltage or a current produced by a stylus. The input/output system 280 may be optional and may be utilized in addition to or in place of the output system 230 and/or the input device 240.

Figure 3:
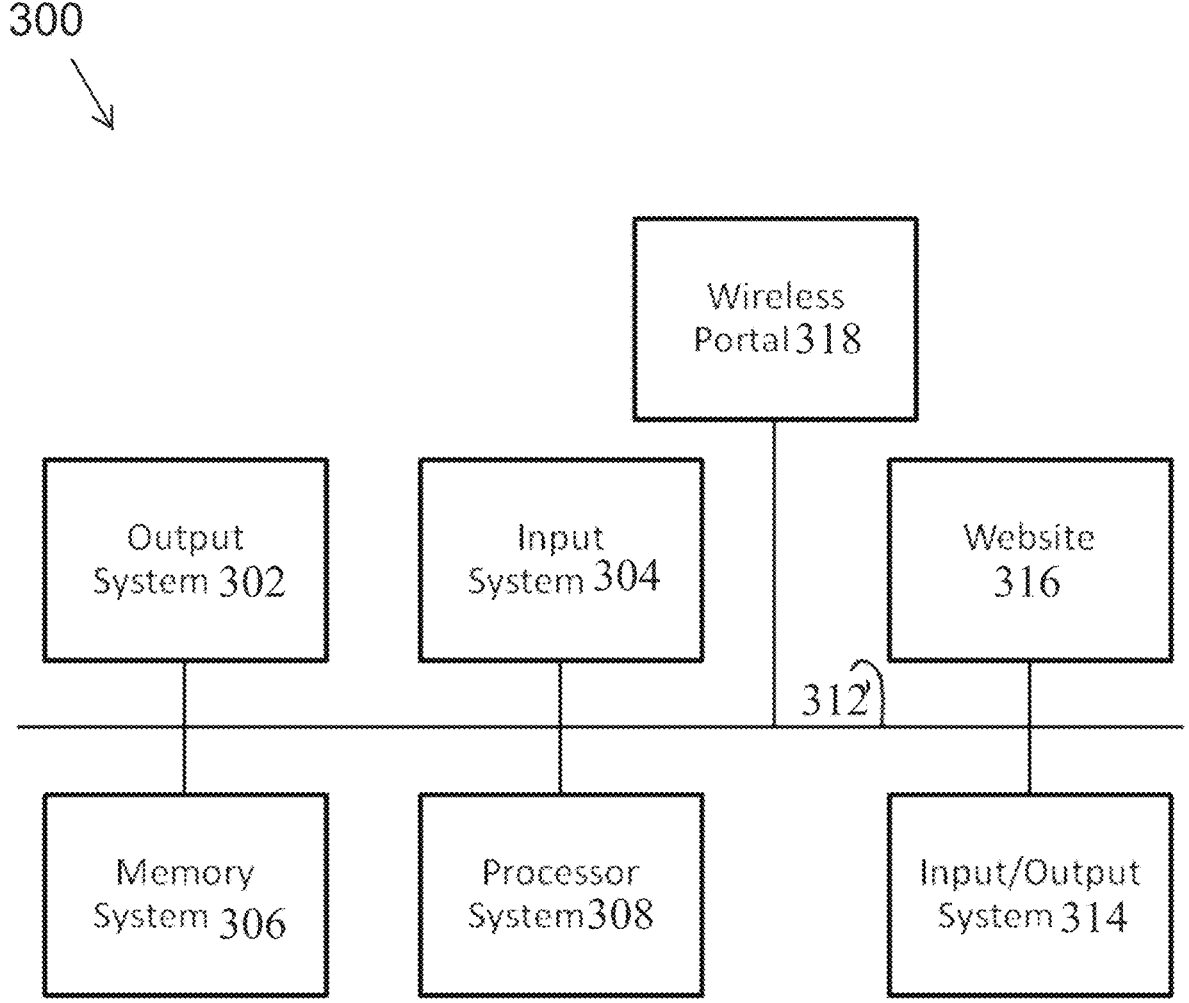
FIG. 3 illustrates a block diagram of a client system, in accordance with one embodiment of the present invention.

FIG. 3 illustrates a block diagram of a client system 300, in accordance with one embodiment of the present invention.

The client system 300 may include an output system 302, an input system 304, a memory system 306, a processor system 308, a communications system 312, an input/output system 314, a website 316 and a wireless portal 318. Other embodiments of the client system 300 may not have all of the components and/or may have other embodiments in addition to or instead of the components listed above.

The client system 300 may be any one of the client systems 310, 314, 316, 318, 320 and/or handheld or mobile wireless device 322, SMARTPHONE® 324 or IPAD® 326 that may be utilized as one of the network devices of FIG. 3. In other embodiments, the client system 300 may include additional components and/or may not include all of the components listed above. The output system 302 may include any one of, some of, any combination of or all of a monitor system, a wireless transmitter, a handheld display system, a printer system, a speaker system, a connection or interface system to a sound system, an interface system to peripheral devices and/or a connection and/or an interface system to a computer system, an intranet, and/or the Internet.

The input system 304 may include any one of, some of, any combination of or all of a keyboard system, a mouse system, a track ball system, a track pad system, one or more buttons on a handheld system, a scanner system, a wireless receiver, a microphone system, a connection to a sound system, and/or a connection and/or an interface system to a computer system, an intranet, and/or the Internet (i.e., infra-red Data Association or IrDA, Universal Serial Bus or USB).

The memory system 306 may include, any one of, some of, any combination of or all of a long-term storage system, such as a hard drive, a short term storage system, such as a random access memory; a removable storage system, such as a floppy drive or a removable drive and/or a flash memory. The memory system 306 may include one or more machine readable mediums that may store a variety of different types of information. The term machine readable medium may be utilized to refer to any medium that may be structurally configured for carrying information in a format that may be readable by a machine. One example of a machine-readable medium may be a computer-readable medium. The memory system 306 may store a non-transitory storage media for measuring and updating customer loyalty for one or more brands.

The processor system 308 may include any one of, some of, any combination of, or all of multiple parallel processors, a single processor, a system of processors having one or more central processors and/or one or more specialized processors dedicated to specific tasks. The processor system 308 may implement the programs stored in the memory system 306. The communications system 312 may communicatively link the output system 302, the input system 304, the memory system 306, the processor system 308, and/or the input/output system 314 to each other. The communications system 312 may include any one of, some of, any combination of, or all of one or more electrical cables, fiber optic cables, and/or means of sending signals through air or water (i.e., wireless communications). Some examples of means of sending signals through air and/or water may include systems for transmitting electromagnetic waves such as infrared and/or radio waves and/or systems for sending sound waves.

The input/output system 314 may include devices that have the dual function as input and output devices. For example, the input/output system 314 may include one or more touch sensitive screens, which display an image and therefore may be an output device and accept input when the screens may be pressed by a finger or a stylus. The touch sensitive screens may be sensitive to heat, capacitance and/or pressure. One or more of the input/output devices may be sensitive to a voltage or a current produced by a stylus. The input/output system 314 is optional, and may be utilized in addition to or in place of the output system 302 and/or the input device 304.

The client systems 310, 314, 316, 318, 320 and the handheld wireless device 322 may also be tied into a website 316 or a wireless portal 318 which may also be tied directly into the communications system 312. Any website 316 or wireless portal 318 may also include a non-transitory storage media and a website module (not shown) to maintain, allow access to and run the website as well.

Figure 4:
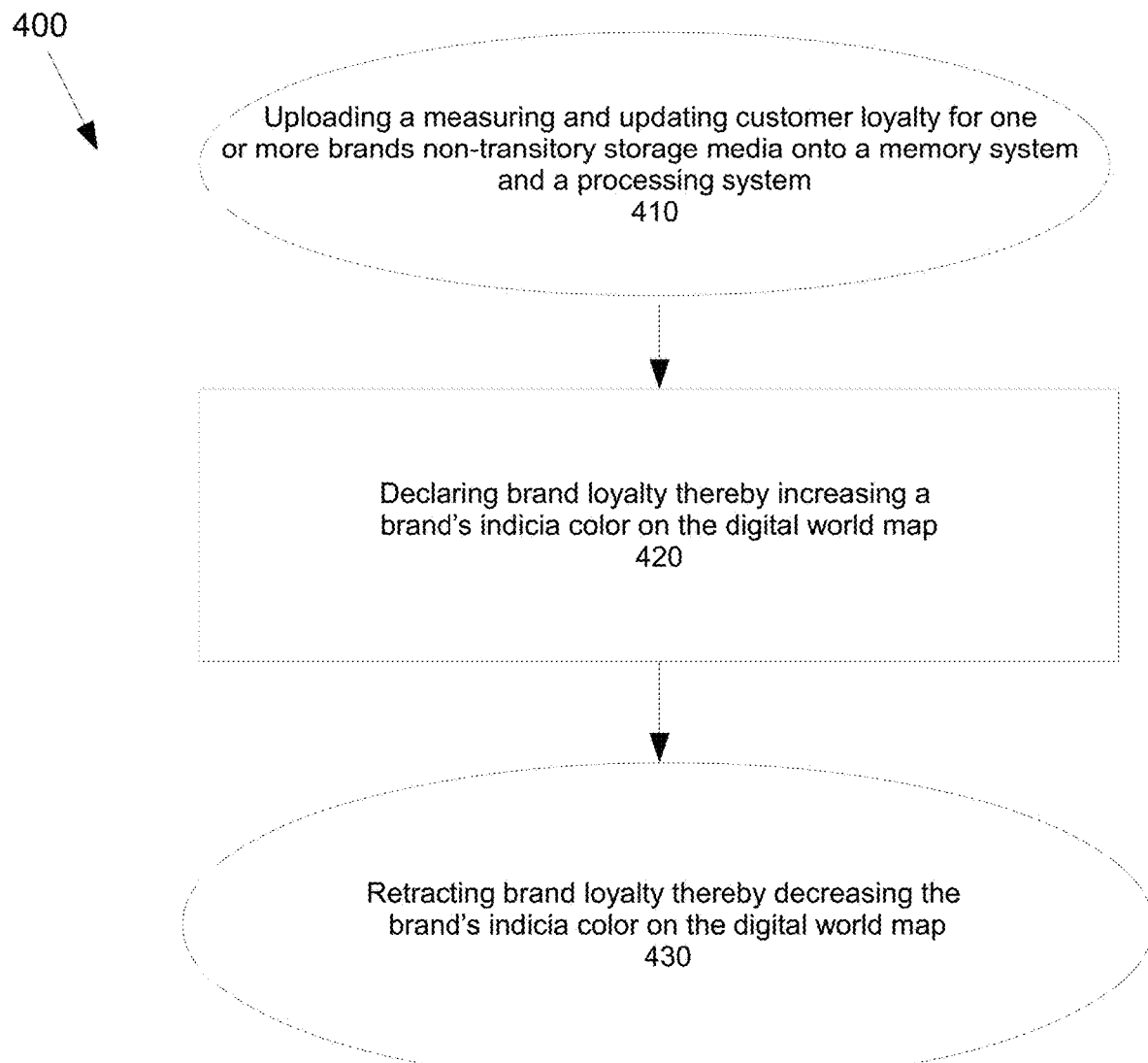
FIG. 4 illustrates a flowchart of a method for instantly measuring and updating customer loyalty for brands on a digital world map through utilization of color and digits, in accordance with one embodiment of the present invention.

FIG. 4 illustrates a flowchart of a method 400 for instantly measuring and updating customer loyalty for one or more brands on a digital world map through utilization of one or more colors and one or more digits, in accordance with one embodiment of the present invention.

The method 400 may include the steps of uploading a non-transitory storage media onto a memory system 410, declaring brand loyalty thereby increasing a brand's indicia color on a digital world map 420 and retracting brand loyalty thereby decreasing the brand's indicia color on the digital world map 430.

The uploading step 410 may include the non-transitory storage media is a measuring and updating customer loyalty for one or more brands non-transitory storage media. The declaring step 420 may include a user purchases one or more brand items. The declaring step 420 may include the brand's indicia color on the digital world map increases as the user purchases one or more brand items. The declaring step 420 may include the user declares brand loyalty. The declaring step 420 may include the user is a registered user and a loyalist to the brand. The retracting step may include the user retracts brand loyalty.

Since registered users or loyalists may only declare loyalty to one brand at a time, the system and method for instantly measuring and updating customer loyalty for brands on a digital world map through utilization of color and digits gives brands the opportunity to adjust their products or services to compete for loyalists who may become potential customers. The system and method for instantly measuring and updating customer loyalty for brands on a digital world map through utilization of color and digits may be utilized on a digital world map and will allow brands to see how popular their brand is in comparison to other registered brands on the platform and thereby offer a more transparent insight into how influential a brand may be in relation to other registered brands utilizing the system and method for instantly measuring and updating customer loyalty for brands on a digital world map through utilization of color and digits.

While the present invention has been related in terms of the foregoing embodiments, those skilled in the art will recognize that the present invention is not limited to the embodiments described. The present invention may be practiced with modification and alteration within the spirit and scope of the appended claims. Thus, the description is to be regarded as illustrative instead of restrictive on the present invention.

The invention claimed is:

1. A system to instantly measure and update customer loyalty for one or more brands on a digital world map through utilization of one or more colors and one or more digits, comprising:

a server system with a processor system, a communications interface, a communications system, an input system and an output system, the server system having access to a communications network;

a memory system with an operating system, a communications module, a web browser module, a web server application and a measuring;

updating customer loyalty for one or more brands non-transitory storage media;

a website displaying a plurality of web pages residing on the measuring and updating customer loyalty for one or more brands non-transitory storage media; and a client system with an output system, an input system, a memory system, a processor system and a communications system that accesses the server system via the communications network, the measuring and updating customer loyalty for one or more brands non-transitory storage media declares brand loyalty with more of a brand's indicia color on a digital world map and retracts brand loyalty with less of the brand's indicia color on the digital world map.

\* \* \* \* \*